US010655557B2

(12) United States Patent
Matsuda et al.

(10) Patent No.: US 10,655,557 B2
(45) Date of Patent: May 19, 2020

(54) CONTROL DEVICE OF INTERNAL COMBUSTION ENGINE

(71) Applicant: HITACHI AUTOMOTIVE SYSTEMS, LTD., Hitachinaka-shi, Ibaraki (JP)

(72) Inventors: Satoshi Matsuda, Hitachinaka (JP); Masahiro Toyohara, Hitachinaka (JP); Osamu Mukaihara, Hitachinaka (JP); Makoto Ijyuin, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 171 days.

(21) Appl. No.: 15/504,397

(22) PCT Filed: Aug. 5, 2015

(86) PCT No.: PCT/JP2015/072158
§ 371 (c)(1),
(2) Date: Feb. 16, 2017

(87) PCT Pub. No.: WO2016/031510
PCT Pub. Date: Mar. 3, 2016

(65) Prior Publication Data
US 2017/0234260 A1 Aug. 17, 2017

(30) Foreign Application Priority Data
Aug. 29, 2014 (JP) .................. 2014-176437

(51) Int. Cl.
*F02D 41/40* (2006.01)
*F02D 41/00* (2006.01)
*F02D 41/30* (2006.01)

(52) U.S. Cl.
CPC ......... *F02D 41/402* (2013.01); *F02D 41/009* (2013.01); *F02D 41/3011* (2013.01);
(Continued)

(58) Field of Classification Search
CPC .. F02D 41/402; F02D 41/009; F02D 41/3011; F02D 2250/04; F02D 2200/06; F02D 2200/0614; Y02T 10/44
See application file for complete search history.

(56) References Cited

U.S. PATENT DOCUMENTS 5,231,962 A    8/1993  Osuka et al.
2009/0150044 A1*  6/2009  Topinka ................ F02D 41/402
                                                    701/103
(Continued)

FOREIGN PATENT DOCUMENTS

JP    05-086932 A    4/1993
JP    2004-068606 A   3/2004
(Continued)

OTHER PUBLICATIONS

Extended European Search Report dated May 2, 2018 for the European Application No. 15835722.8.
(Continued)

*Primary Examiner* — Xiao En Mo
(74) *Attorney, Agent, or Firm* — Volpe and Koenig, P.C.

(57) ABSTRACT

In control device of an internal combustion engine, for each first period, a calculation unit calculates number of fuel injections within one combustion cycle and fuel injection rate. For first period, a first storage unit stores number of fuel injections and fuel injection rate of calculation unit. For each second period, a reference unit refers to the number of fuel injections and fuel injection rate stored by the first storage unit. A second storage unit stores for an interval, from the start time of the first fuel injection until start of the last fuel injection of at least one combustion cycle, the number of fuel injections and fuel injection rate referred to by reference unit. A control unit controls a fuel injection valve so that fuel
(Continued)

is injected in accordance with the number of fuel injections fuel injection rate stored by second storage unit.

15 Claims, 15 Drawing Sheets

(52) U.S. Cl.
CPC .. *F02D 2200/06* (2013.01); *F02D 2200/0614* (2013.01); *F02D 2250/04* (2013.01); *Y02T 10/44* (2013.01)

(56) References Cited

U.S. PATENT DOCUMENTS

| | | | |
|---|---|---|---|
| 2010/0030454 | A1 | 2/2010 | Olbrich et al. |
| 2011/0100333 | A1 | 5/2011 | Toyohara et al. |
| 2012/0116654 | A1 | 5/2012 | Toyohara et al. |
| 2014/0123956 | A1 | 5/2014 | Arihara |
| 2014/0297162 | A1* | 10/2014 | Surnilla .............. F02D 41/3094 701/104 |

FOREIGN PATENT DOCUMENTS

| | | |
|---|---|---|
| JP | 2011-094562 A | 5/2011 |
| JP | 2011-132898 A | 7/2011 |
| JP | 2012-012972 A | 1/2012 |
| JP | 2012-097693 A | 5/2012 |
| WO | 2012/004884 A1 | 1/2012 |

OTHER PUBLICATIONS

Chinese Office Action dated Oct. 22, 2019 for the Chinese Patent Application No. 201580043250.6.

\* cited by examiner

[Fig. 1]
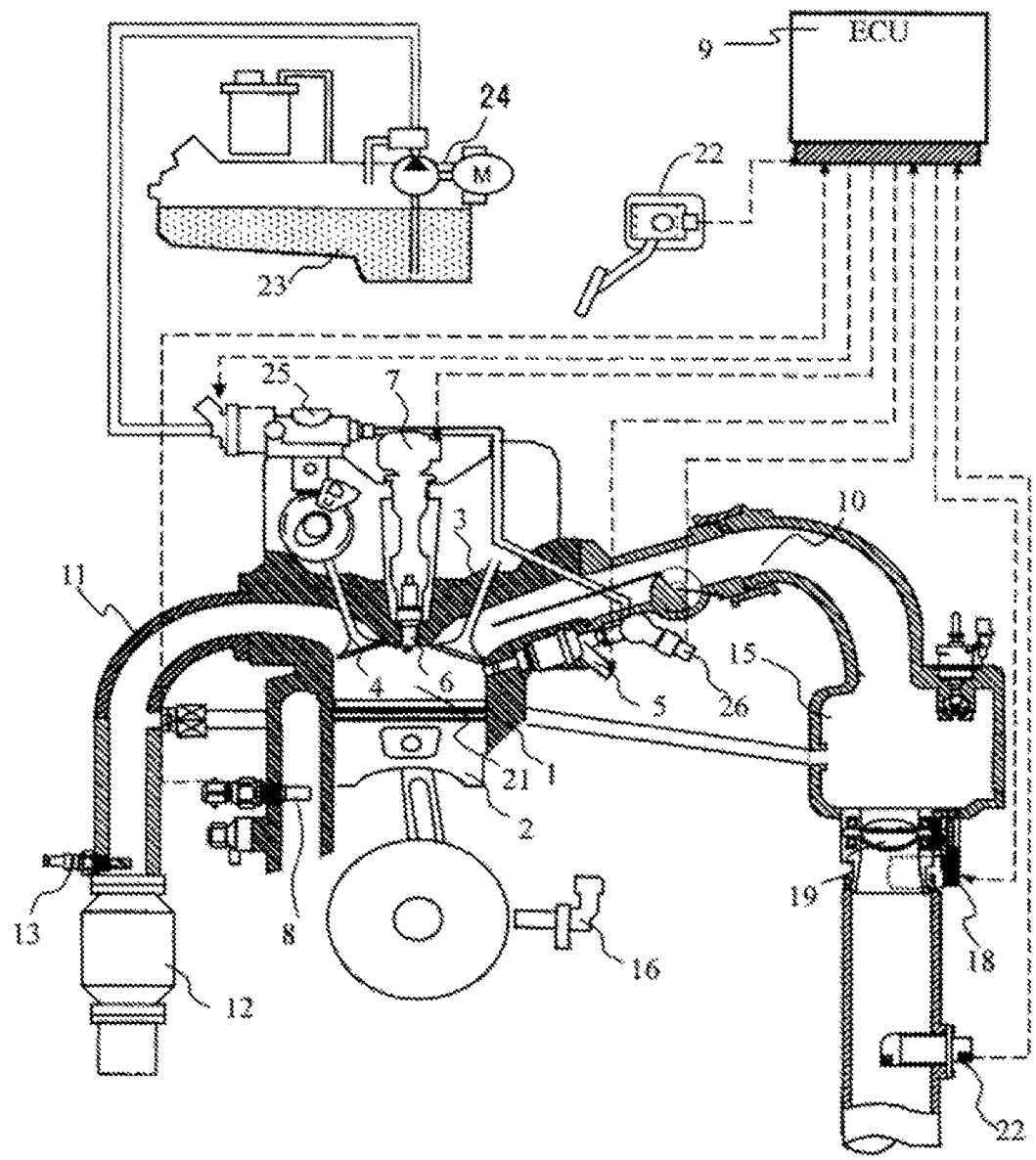

[Fig. 2]
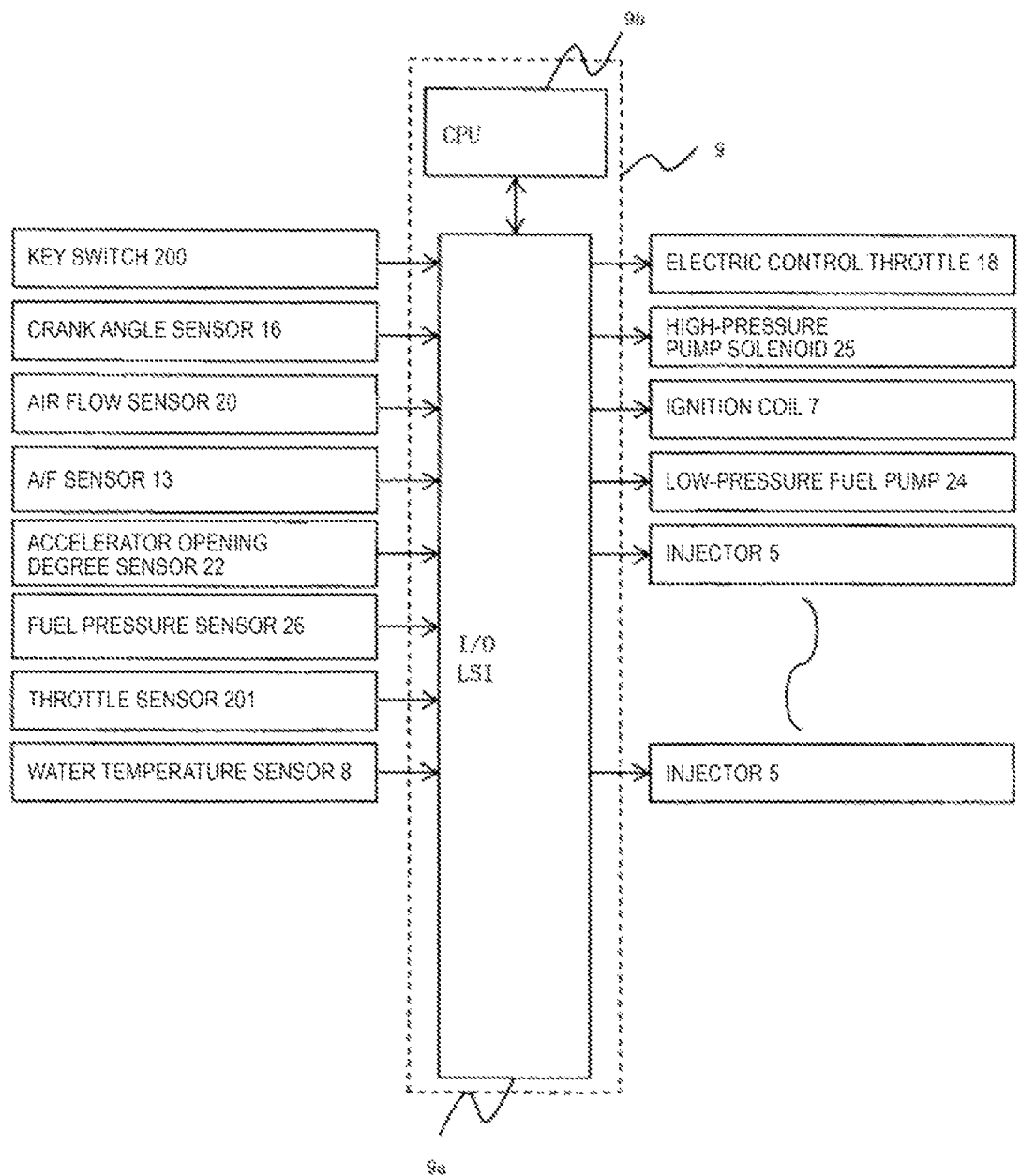

[Fig. 3]
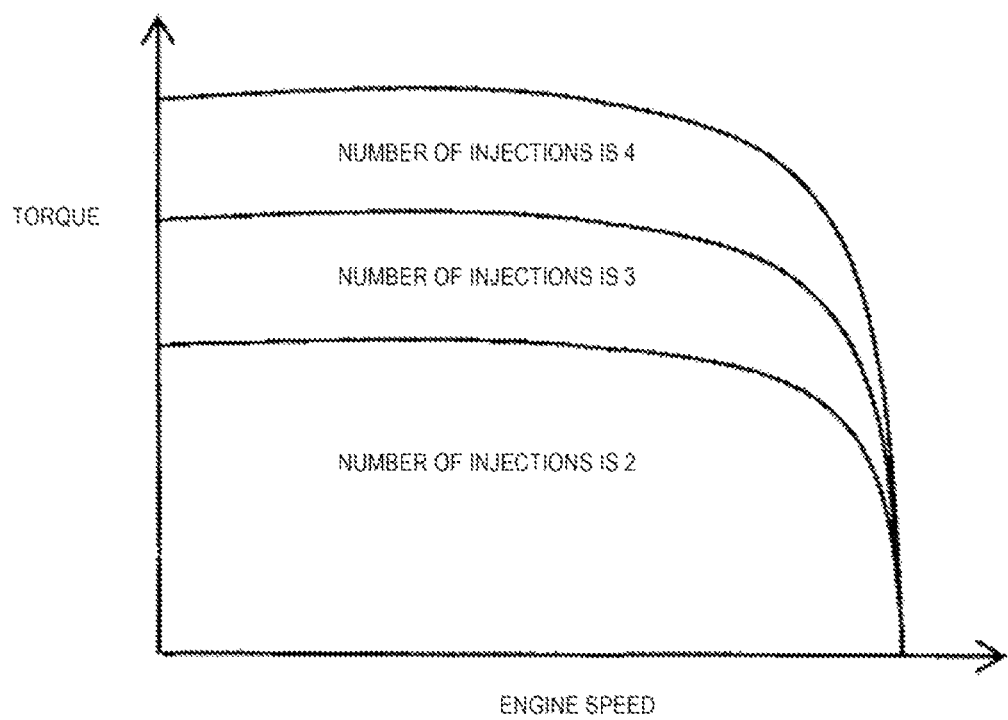

[Fig. 4]
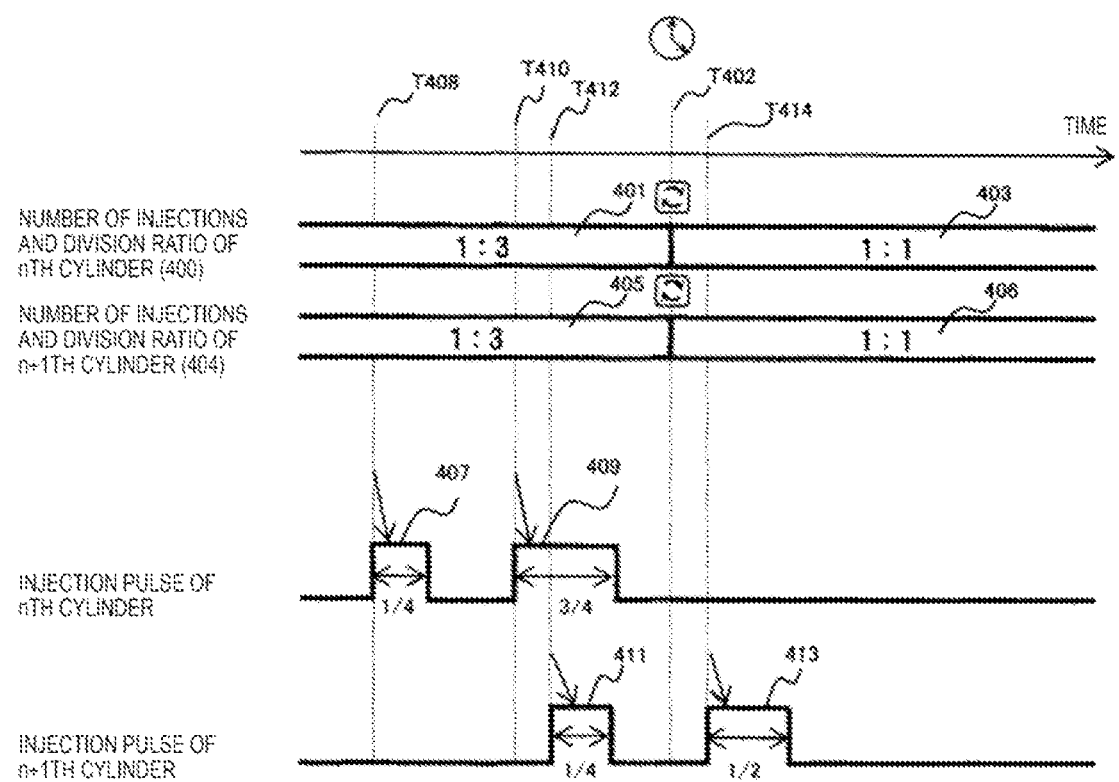

[Fig. 5]
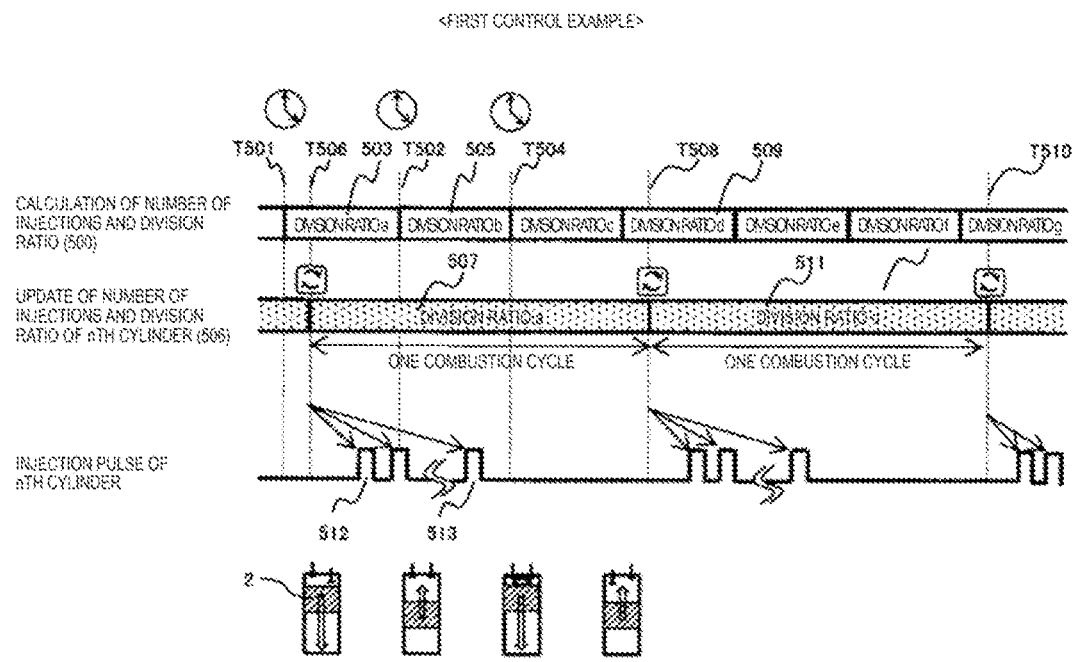

[Fig. 6]
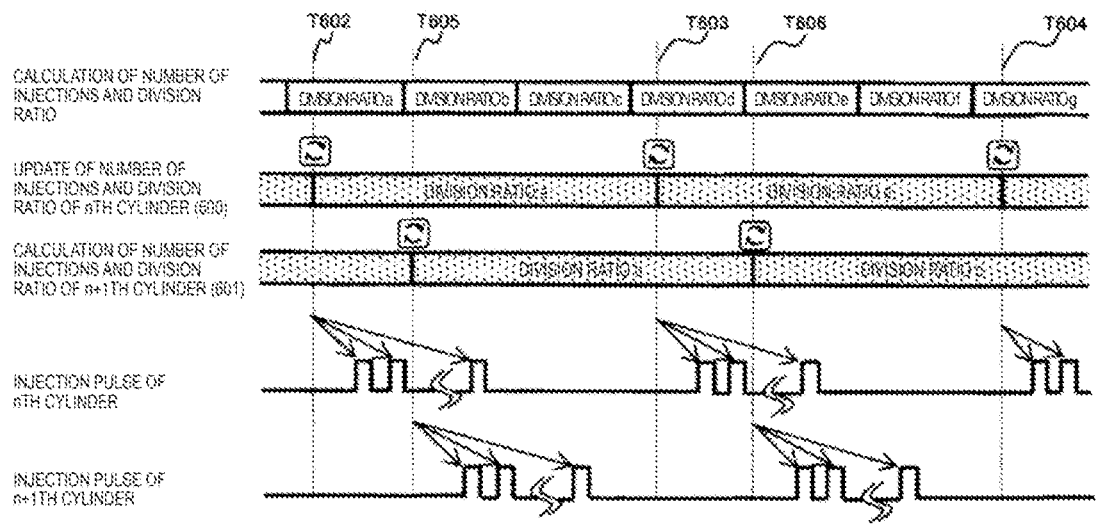

[Fig. 7]
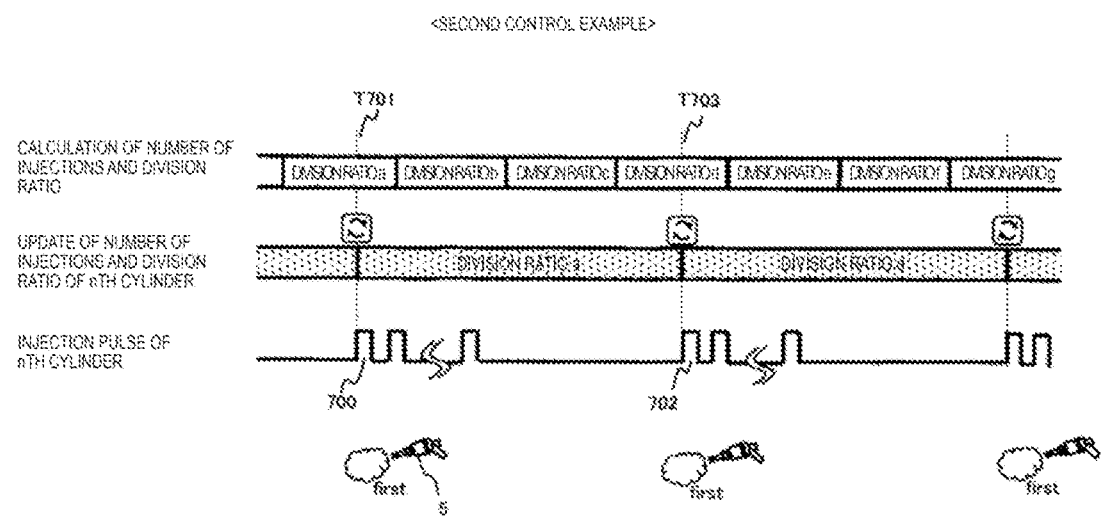

[Fig. 8]
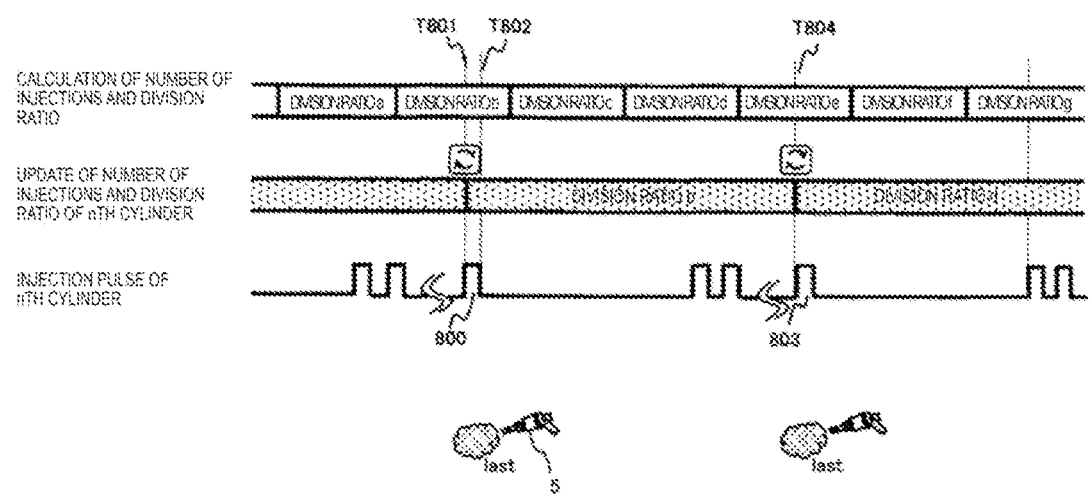

[Fig. 9]
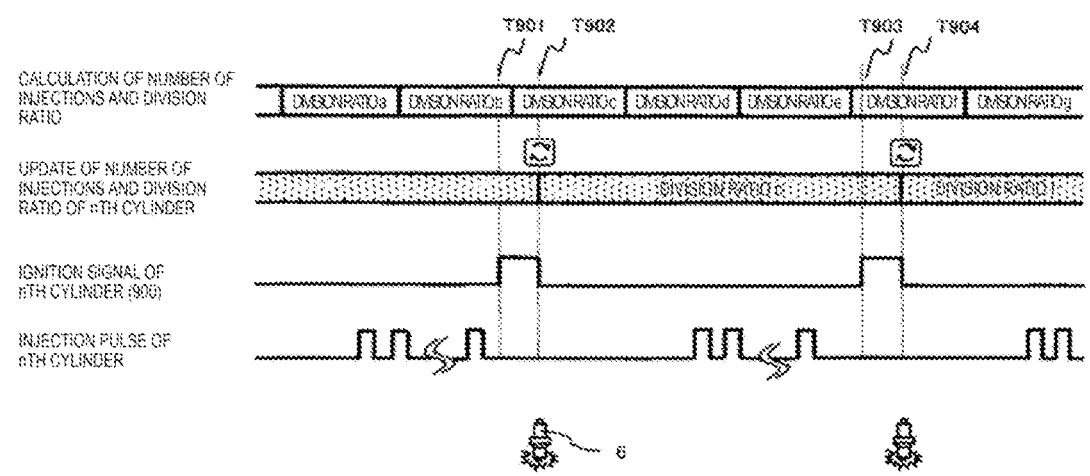

[Fig. 10]
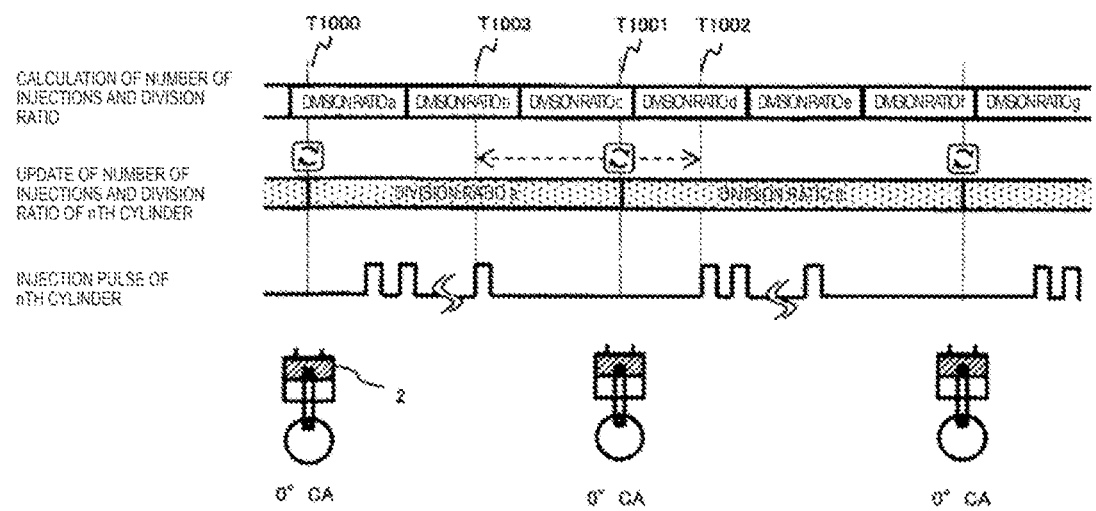

[Fig. 11]
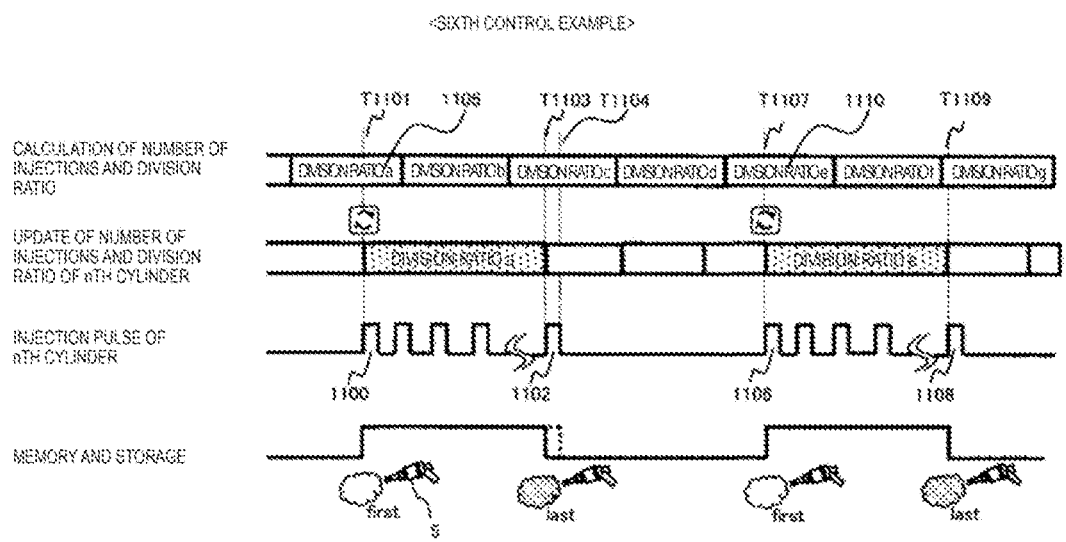

[Fig. 12]
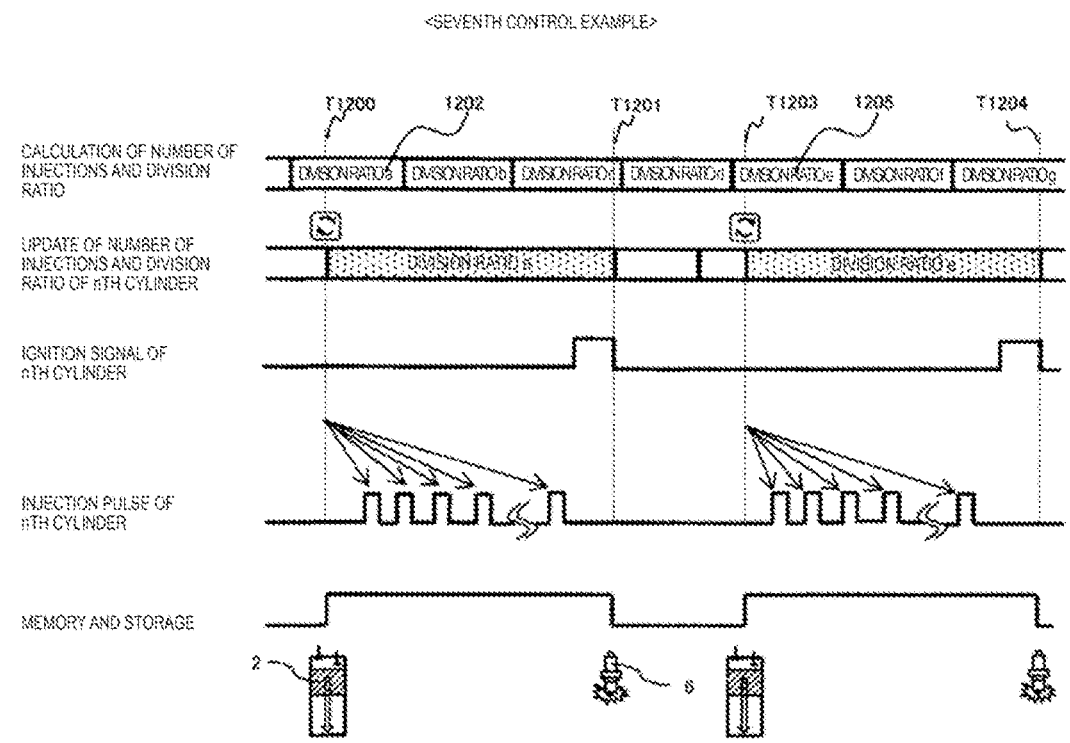

[Fig. 13]
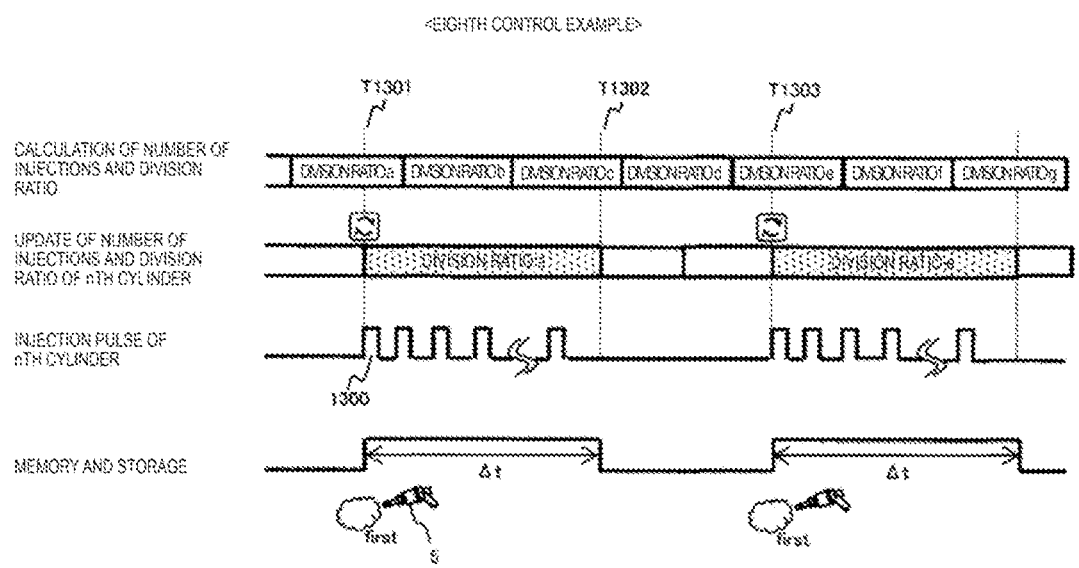

[Fig. 14]
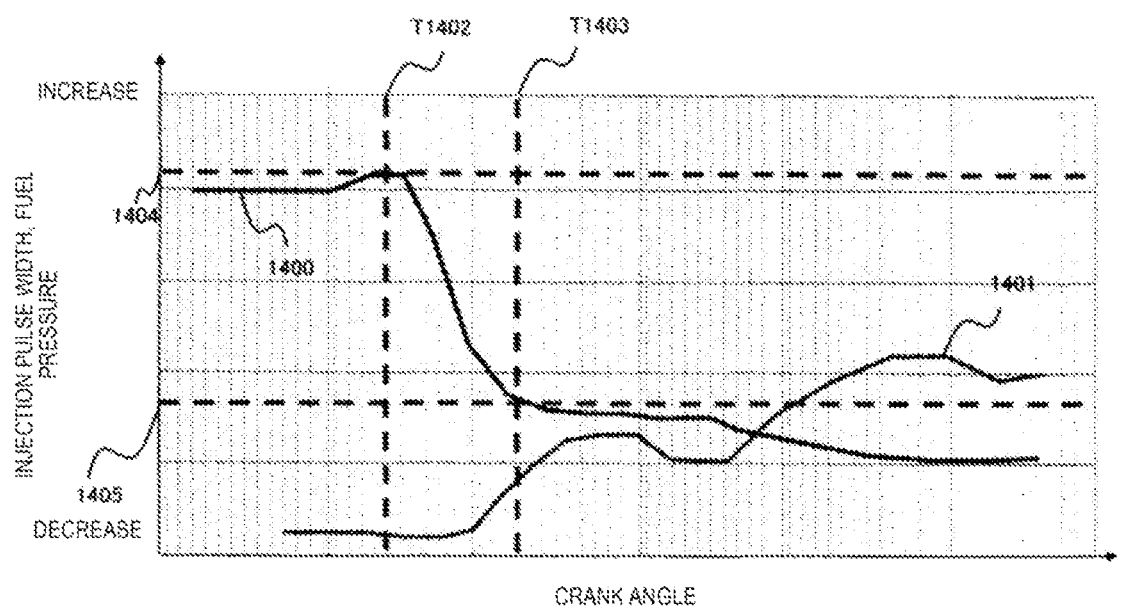

[Fig. 15]
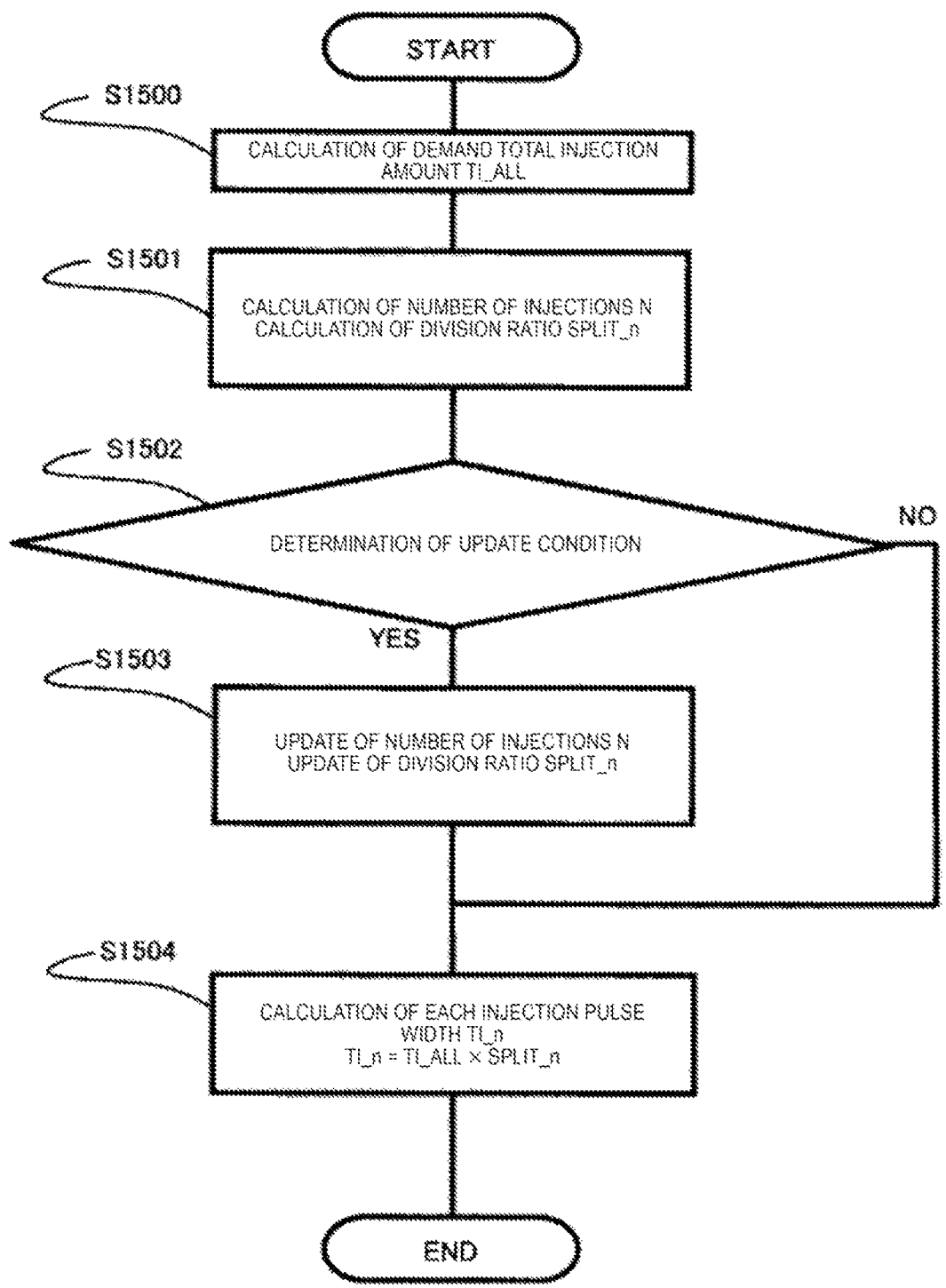

CONTROL DEVICE OF INTERNAL COMBUSTION ENGINE

TECHNICAL FIELD

The present invention relates to a control device of an internal combustion engine.

BACKGROUND ART

A multi-stage injection control, in which a plurality of times of fuel injections are performed during one combustion cycle, is disclosed (for example, see PTL 1). According to such a multi-stage injection control, it is possible to reduce an adhering amount of fuel within a cylinder and to increase uniformity of an air-fuel mixture, and it is possible to reduce exhaust emission.

CITATION LIST

Patent Literature

PTL 1: JP-A-2011-132898

SUMMARY OF INVENTION

Technical Problem

In the multi-stage injection control, a division ratio for allocating a demand total injection amount to each injection during one combustion cycle is determined based on an operation state of the internal combustion engine. Therefore, optimization for combustion demand can be performed while guaranteeing accuracy with respect to an air/fuel ratio. However, in the control disclosed in PTL 1, the operation state is changed, a demand change of the division ratio is reflected in each injection amount, the division ratio and the total injection amount cannot be kept and thereby there is a problem that a desired air/fuel ratio cannot be controlled with high accuracy.

In addition, as a feature of a fuel injection valve, in order to inject the same amount of fuel, it is necessary to correct a fuel injection pulse width by a fuel pressure supplied to the fuel injection valve. However, even in such a case, there is a problem that it is impossible to accurately control a desired air/fuel ratio when injecting is performed multiple times.

The invention is made to solve the two problems described above. An object of the invention is to provide a control device of an internal combustion engine enabling a demand air/fuel ratio to be satisfied with high accuracy.

Solution to Problem

In order to achieve the object described above, the invention provides a control device of an internal combustion engine including a calculation unit that calculates the number of fuel injections within one combustion cycle and a fuel injection rate, which indicates each fuel injection rate within one combustion cycle for each first period; a first storage unit that stores the number of fuel injections and the fuel injection rate calculated by the calculation unit in the first period; a reference unit that refers to the number of fuel injections and the fuel injection rate stored by the first storage unit for each second period which is different from the first period; a second storage unit that stores the number of fuel injections and the fuel injection rate referred to by the reference unit in an interval from a start time of a first fuel injection of at least one combustion cycle until a start time of the last fuel injection; and a control unit that controls a fuel injection valve in a manner such that fuel is injected in accordance with the number of fuel injections and the fuel injection rate stored by the second storage unit.

Advantageous Effects of Invention

According to the invention, it is possible to satisfy the demand air/fuel ratio with high accuracy. Problems, configurations, and effects other than the above description are clarified by the description of the following embodiments.

BRIEF DESCRIPTION OF DRAWINGS

FIG. 1 is a schematic view illustrating an entire configuration of an internal combustion engine system including an ECU according to an embodiment of the invention.

FIG. 2 is a block diagram illustrating a relationship between input and output signals of the ECU illustrated in FIG. 1.

FIG. 3 is a diagram illustrating an example of the number of multi-stage injections calculated by the ECU according to an embodiment of the invention.

FIG. 4 is a diagram for explaining a first problem of a multi-stage injection control.

FIG. 5 is a time chart illustrating a first control example of a fuel injection control executed by the ECU according to an embodiment of the invention.

FIG. 6 is a time chart illustrating an application example of a first control of the fuel injection control executed by the ECU according to an embodiment of the invention.

FIG. 7 is a time chart illustrating a second control example of the fuel injection control executed by the ECU according to an embodiment of the invention.

FIG. 8 is a time chart illustrating a third control example of the fuel injection control executed by the ECU according to an embodiment of the invention.

FIG. 9 is a time chart illustrating a fourth control example of the fuel injection control executed by the ECU according to an embodiment of the invention.

FIG. 10 is a time chart illustrating a fifth control example of the fuel injection control executed by the ECU according to an embodiment of the invention.

FIG. 11 is a time chart illustrating a sixth control example of the fuel injection control executed by the ECU according to an embodiment of the invention.

FIG. 12 is a time chart illustrating a seventh control example of the fuel injection control executed by the ECU according to an embodiment of the invention.

FIG. 13 is a time chart illustrating an eighth control example of the fuel injection control executed by the ECU according to an embodiment of the invention.

FIG. 14 is a diagram explaining a second problem of a multi-stage injection control.

FIG. 15 is an example of a flowchart of a calculation control and a multi-stage injection control of the number of injections and the division ratio executed by the ECU according to an embodiment of the invention.

DESCRIPTION OF EMBODIMENTS

Hereinafter, a configuration and an operation of an Engine Control Unit (ECU) according to an embodiment of the invention will be described with reference to the drawings. Moreover, in each drawing, the same reference numerals are given to the same portions. The ECU as a control device of an internal combustion engine controls fuel injection as described below.

(Configuration of Internal Combustion Engine System)

First, a basic configuration of the internal combustion engine and the control device (ECU) that controls the fuel injection will be described with reference to FIG. 1. FIG. 1 is a schematic view illustrating an entire configuration of an internal combustion engine system including an ECU 9 according to an embodiment of the invention.

As illustrated in FIG. 1, an engine 1 is provided with a piston 2, an intake valve 3, and an exhaust valve 4. Intake air passes through an air flow meter (air flow sensor) 22, enters a throttle valve 19, and is supplied from a collector 15 that is a branch unit to a combustion chamber 21 of the engine 1 via an intake pipe 10 and the intake valve 3. A signal indicating an intake flow rate is output from the air flow sensor 22 to the ECU 9.

Fuel is supplied from a fuel tank 23 to the internal combustion engine by a low-pressure fuel pump 24 and is further raised to a pressure necessary for the fuel injection by a high-pressure fuel pump 25. Fuel is injected and supplied from a fuel injection valve 5 (hereinafter, referred to as an injector 5) to the combustion chamber 21 of the engine 1, and is ignited by an ignition coil 7 and an ignition plug 6.

An ignition control is a mechanism that is performed by an electrifying control to the ignition coil 7 at a desired ignition time by the ECU 9. In addition, a pressure of fuel is measured by a fuel pressure sensor 26 and a signal thereof is output to the ECU 9. Exhaust gas after combustion is discharged to an exhaust pipe 11 via the exhaust valve 4. The exhaust pipe 11 is provided with a three-way catalyst 12 purifying the exhaust gas.

(Configuration of ECU)

Next, an example of the ECU 9 according to an embodiment of the invention will be described with reference to FIG. 2. FIG. 2 is a block diagram illustrating a relationship between input and output signals of the ECU 9 illustrated in FIG. 1.

The ECU 9 is configured of an I/O LSI 9a including an A/D converter, a CPU 9b, and the like. A signal of a key switch 200 indicating ignition ON and starter ON, a signal of a crank angle sensor 16 of FIG. 1, an air quantity signal of the air flow sensor 22 of FIG. 1, a signal of an A/F sensor 13 of FIG. 1 that detects an oxygen concentration in the exhaust gas, a signal of an accelerator opening degree of the accelerator opening degree sensor 22 of FIG. 1, a signal of the fuel pressure sensor 26 of FIG. 1, a signal of a throttle sensor 201 (not illustrated), or the like is input into the ECU 9.

The ECU 9 executes a predetermined calculation process, outputs various control signals calculated as calculation results, and supplies predetermined control signals to an electric control throttle 18 of FIG. 1 that is an actuator, the low-pressure fuel pump 24 of FIG. 1, the high-pressure pump solenoid 25 of FIG. 1, the ignition coil 7 of FIG. 1, and the injector 5 of FIG. 1.

The I/O LSI 9a of FIG. 2 is provided with a drive circuit (not illustrated) that drives the injector 5 of FIG. 1, boosts and supplies a voltage supplied from a battery using a boosting circuit (not illustrated), and controls a current using a drive IC (not illustrated) to drive the injector 5.

In addition, the ECU 9 is provided with a rotation speed detecting unit that calculates an engine speed from a signal of the crank angle sensor 16, and a unit that determines whether or not the three-way catalyst 12 of FIG. 1 is warmed up from a water temperature of the internal combustion engine obtained from a water temperature sensor 8 of FIG. 1, an elapsed time after engine start, or the like. Moreover, in a case of an intake port injection type, the injector 5 is mounted on a portion of the intake pipe 10.

From the above, a drive control and a fuel injection amount of the injector 5 necessary for the combustion of the internal combustion engine can be optimally controlled.

(Number of Multi-Stage Injections)

Next, an example of the number of injections of multi-stage injection will be described with reference to FIG. 3. FIG. 3 is a diagram illustrating an example of the number of multi-stage injections calculated by the ECU according to an embodiment of the invention.

Although not illustrated in FIG. 3, the number of injections to be injected during one combustion cycle which is from a start of an intake stroke to an end of an exhaust stroke of each cylinder is calculated based on an operation state of the engine such as the engine speed of the internal combustion engine or a demand torque. The number of injections is determined from a demand from performance improvement of the internal combustion engine, a minimum injection pulse width in which the injector 5 can inject with high accuracy, and a performance of the ECU 9.

(First Problem)

An example of an injection control when the division ratio (the fuel injection rate) of the multi-stage injection is changed will be described with reference to FIG. 4. FIG. 4 is a diagram for explaining a first problem of a multi-stage injection control.

Reference numeral 400 of FIG. 4 indicates a calculation period of the number of injections and the division ratio of the multi-stage injection of nth cylinder. At time of 401, it is shown that the number of injections is 2, a first injection division ratio is 1, and a second injection division ratio is 3. At time T402 of FIG. 4, the calculation period is obtained and the second injection division ratio is changed from 3 to 1 by a change in the operation state. At time of 403, it is shown that the number of injections of the nth cylinder is 2, the first injection division ratio is 1, and the second injection division ratio is 1.

Reference numeral 404 of FIG. 4 indicates a calculation time of the number of injections and the division ratio of the multi-stage injection of n+1th cylinder. Similar to the above description, at time of 405, it is shown that the number of injections is 2, the first injection division ratio is 1, and, the second injection division ratio is 3, and at time T402, the calculation period is obtained, it is shown that the second injection division ratio is changed from 3 to 1 by the change in the operation state, at time of 406, the number of injections is 2, the first injection division ratio is 1, and the second injection division ratio is 1.

Reference numeral 407 is an injection pulse for executing a first injection of one combustion cycle of the nth cylinder and the fuel injection is performed from the injector 5 based on the pulse signal. At output start time T408 of the injection pulse 407, for the number of injections and the division ratio of the nth cylinder, the number of injections is 2, the first injection division ratio is 1, and the second injection division ratio is 3 from 401. Therefore, the injection pulse required to inject ¼ of a total injection amount is output.

Similarly, at output start time T410 of 409 that is the injection pulse for executing the second injection of the combustion cycle, for the number of injections and the division ratio of the nth cylinder, the number of injections is 2, the first injection division ratio is 1, and the second injection division ratio is 3 from 401. Therefore, the injection pulse required to inject ¾ of the total injection amount is output.

Similarly, at output start time T412 of 411 that is the injection pulse for executing the first injection of one combustion cycle of the n+1th cylinder, for the number of injections and the division ratio of the n+1th cylinder, the number of injections is 2, the first injection division ratio is 1, and the second injection division ratio is 3 from 405. Therefore, the injection pulse required to inject ¼ of the total injection amount is output.

At output start time T414 of 413 that is the injection pulse for executing the second injection of one combustion cycle of the n+1th cylinder, for the number of injections and the division ratio of the n+1th cylinder, the number of injections is 2, the first injection division ratio is 1, and the second injection division ratio is 1 from 406. Therefore, the injection pulse required to inject ½ of the total injection amount is output.

A case of this example, in the n+1th cylinder, even if the first injection amount and the second injection amount are added, a desired total injection amount is not obtained due to a change in the division ratio and, as a result, the air/fuel ratio of the internal combustion engine cannot be controlled to a desired value. The second injection division ratio may be increased in the change in the division ratio illustrated in FIG. 4, also in this case, the demand air/fuel ratio cannot be satisfied.

From the above, the demand air/fuel ratio of the internal combustion engine cannot be maintained because the fuel injection time is different from the calculation of the number of injections and the division ratio.

In contrast, the ECU 9 according to an embodiment of the invention performs the fuel injection control to satisfy the desired air/fuel ratio even in a case where the number of demand injections and the demand of the division ratio are changed. Hereinafter, the fuel injection control executed by the ECU 9 according to an embodiment of the invention will be described.

First Control Example

Next, a first control example of the fuel injection control will be described with reference to FIG. 5. FIG. 5 is a time chart illustrating the first control example of the fuel injection control executed by the ECU according to an embodiment of the invention.

In FIG. 5, as an example, a time (hereinafter, referred to as an injection control reference position) that serves as a reference for setting at least one of each injection time and each injection pulse width of the multi-stage injection within one combustion cycle refers to an update time of the invention. The injection control reference position is, for example, a predetermined time of the intake stroke.

Reference numeral 500 of FIG. 5 indicates a calculation time of the number of injections and the division ratio of the multi-stage injection. At time T501, the number of injections and the division ratio are calculated, at 503 up to the next calculation time T502, the calculation result at T501 is obtained. Similarly, at the next time T502, the number of injections and the division ratio are calculated, at 505 up to the next calculation time T504, the calculation result at T502 is obtained.

Here, the ECU 9 functions as a calculation unit that calculates a fuel injection rate indicating a rate of the number of fuel injections within one combustion cycle and each fuel injection rate within one combustion cycle for each first period (calculation period). In addition, the ECU 9 and a memory (not illustrated) cooperate to function as a first storage unit that stores the number of fuel injections and the fuel injection rate calculated by the calculation unit in the first period. Moreover, the memory may be built in the ECU 9, or may be provided on an outside of the ECU 9.

Reference numeral 506 of FIG. 5 indicates an update time of the number of injections and the division ratio which are used when calculating each injection amount of the multi-stage injection of the nth cylinder. In an example of FIG. 5, the injection control reference position is the update time and the injection control reference position T506 is updated to a value of 503 that is a calculation result of the latest number of injections and the division ratio. Reference numeral 507 until the injection control reference position T508 of the next combustion cycle, which is the next update time, becomes the value of 503.

Here, for each second period (update period of the number of injections and the division ratio which are used when executing the fuel injection) different from the first period, the ECU 9 functions as a reference unit that refers the number of fuel injections and the fuel injection rate stored by the first storage unit. In addition, the ECU 9 and a memory (not illustrated) cooperate to function as a second storage unit that stores the number of fuel injections and the fuel injection rate referred to by the reference unit in an interval from a start time of a first fuel injection to a start time of the last fuel injection of at least one combustion cycle.

Moreover, the second storage unit starts to store (immediately after the reference or after a predetermined time has elapsed) in synchronization with the reference of the reference unit. The first period (for example, an interval from T501 to T502) is shorter than the second period (for example, an interval from T506 to T508). For example, the second period is a period in synchronization with the rotation of the internal combustion engine.

Similarly, the injection control reference position T508 that is the next update time is updated to a value of 509 that is a calculation result of the latest number of injections and the division ratio. Reference numeral 511 until the injection control reference position T510 of the next combustion cycle, which is the next update time, becomes the value of 509. The value of 507 is used for calculation of each injection amount of the injection pulse 513 for executing the last injection from the injection pulse 512 for executing the first injection of the multi-stage injection within one combustion cycle of FIG. 5. Therefore, the number of injections and the division ratio can be constantly held during the injection interval while reflecting the latest number of injections and the division ratio to each injection amount.

Here, the ECU 9 functions as a control unit that controls the fuel injection valve so as to inject fuel according to the number of fuel injections and the fuel injection rate stored by the second storage unit.

As described above, according to the embodiment, in the interval from the start time of the first fuel injection to the start time of the last fuel injection of one combustion cycle, the number of fuel injections and the fuel injection rate, which are used in the control of the fuel injection valve, are not changed. Therefore, it is possible to satisfy the demand air/fuel ratio with high accuracy.

(Application Example of First Control)

The number of injections and the division ratio can be constantly held during the injection interval of the cylinder while reflecting the latest number of injections and the division ratio to each cylinder by separately setting the injection control reference positions respectively in each cylinder.

Hereinafter, an application example of the first control illustrated in FIG. 5 will be described with reference to FIG. 6. FIG. 6 is a time chart illustrating the application example of the first control of the fuel injection control executed by the ECU according to an embodiment of the invention. In FIG. 6, the injection control reference positions are separately set in each cylinder.

Reference numeral 600 of FIG. 6 indicates an update time of the number of injections and the division ratio which are used when calculating each injection amount of the multi-stage injection of the nth cylinder. In the injection control reference position T602 or T603 of the nth cylinder, the values of the number of injections and the division ratio are updated.

Reference numeral 601 of FIG. 6 indicates an update time of the number of injections and the division ratio which are used when calculating each injection amount of the multi-stage injection of the n+1th cylinder (next cylinder). In the injection control reference position T605 or T606 of the n+1th cylinder, the values of the number of injections and the division ratio are updated. In the calculation of each injection amount of the multi-stage injection of the nth cylinder, the value of 600 is used, and in the calculation of each injection amount of the multi-stage injection of the n+1th cylinder, the value of 601 is used. Therefore, the number of injections and the division ratio can be constantly held during the injection interval of the cylinder while reflecting the latest number of injections and the division ratio in each cylinder.

In FIGS. 5 and 6, the injection control reference position is the update time. However, even if an injection start time of a first injection pulse in one combustion cycle, an injection start time of the last injection pulse or an injection end time in one combustion cycle, an ignition time in one combustion cycle, or a time based on a crank angle is the update time, similar to the above description, the number of injections and the division ratio during the injection interval of the cylinder can be constantly held. The update time will be described with reference to FIGS. 7 to 10.

Second Control Example

Next, a second control example of the fuel injection control will be described with reference to FIG. 7. FIG. 7 is a time chart illustrating the second control example of the fuel injection control executed by the ECU according to an embodiment of the invention. In FIG. 7, an injection start time of the first injection pulse within one combustion cycle is the update time.

That is, the start time of the second period (for example, an interval from T701 to T703) is the start time (T701) of the first fuel injection (700) in one combustion cycle.

At the injection start time T701 of the first injection 700 of one combustion cycle, the number of injections and the division ratio which are used when calculating each injection amount of the multi-stage injection of the nth cylinder are updated to the latest values. Similarly, at the injection start time T703 of the first injection 702 of the next combustion cycle, the number of injections and the division ratio are updated to the latest values.

Therefore, it is possible to obtain effects similar to those described in FIGS. 5 and 6.

Third Control Example

Next, a third control example of the fuel injection control will be described with reference to FIG. 8.

FIG. 8 is a time chart illustrating a third control example of the fuel injection control executed by the ECU according to an embodiment of the invention. In FIG. 8, an injection start time of the last injection pulse within one combustion cycle is the update time.

At the injection start time T801 of the last injection 800 of one combustion cycle, the number of injections and the division ratio which are used when calculating each injection amount of the multi-stage injection of the nth cylinder is updated to the latest value. In addition, in a case where an injection pulse width during injection is capable of changing, an injection end time T802 of the last injection pulse 800 may be an update time.

That is, the start time of the second period (for example, an interval from T801 to T804) is a start time (T801) or an end time (T802) of the last fuel injection (800) in one combustion cycle before one combustion cycle.

Similarly, at the injection start time T804 of the last injection 803 of the next combustion cycle, the number of injections and the division ratio are updated to the latest value.

Therefore, it is possible to obtain effects similar to those described in FIGS. 5 to 7.

Fourth Control Example

Next, a fourth control example of the fuel injection control will be described with reference to FIG. 9.

FIG. 9 is a time chart illustrating a fourth control example of the fuel injection control executed by the ECU according to an embodiment of the invention. In FIG. 9, an ignition time within one combustion cycle is the update time.

Reference numeral 900 of FIG. 9 is an ignition signal of the nth cylinder and ignition is performed at a time in which electric connection is performed to the ignition coil 7 at T901, and electric connection is blocked at T902. At the electric connection time of T901 or the ignition time of T902, the number of injections and the division ratio which are used when calculating each injection amount of the multi-stage injection of the nth cylinder are updated to the latest values.

That is, the start time of the second period (for example, an interval from T902 to T904) is the ignition time (T902) in one combustion cycle before one combustion cycle.

Similarly, at the electric connection time T903 or the ignition time T904 of the next combustion cycle, the number of injections and the division ratio which are used when calculating each injection amount of the multi-stage injection of the nth cylinder are updated to the latest values.

Therefore, it is possible to obtain effects similar to those described in FIGS. 5 to 8.

Fifth Control Example

Next, a fifth control example of the fuel injection control will be described with reference to FIG. 10.

FIG. 10 is a time chart illustrating the fifth control example of the fuel injection control executed by the ECU according to an embodiment of the invention. In FIG. 10, a specific time is the update time.

Reference numeral T1000 of FIG. 10 is an intake stroke start (crank angle 0°) of one combustion cycle and the number of injections and the division ratio which are used when calculating each injection amount of the multi-stage injection of the nth cylinder at T1000 are updated to the latest calculation values. Similarly, at the intake stroke start (crank angle 0°) of the next combustion cycle, the number of injections and the division ratio at T1001 are updated to the latest values.

That is, the start time of the second period (for example, an interval from T1000 to T1001) is a predetermined time of the intake stroke of one combustion cycle. The predetermined time is, for example, a time according to a predetermined crank angle.

In FIG. 10, although the crank angle 0° is the update time, a more advance side than the first injection start time of one combustion cycle may be the update time. However, it is set to be more retard side than the last injection start time of a pre-combustion cycle. When explaining an example in FIG. 10, the predetermined time is a time which is on the advance side more than the first injection start time T1002 and on the retard side more than the last injection start time T1003 of one combustion cycle.

Therefore, it is possible to obtain effects similar to those described in FIGS. 5 to 9.

Sixth Control Example

Next, a sixth control example of the fuel injection control will be described with reference to FIG. 11. FIG. 11 is a time chart illustrating the sixth control example of the fuel injection control executed by the ECU according to an embodiment of the invention. FIG. 11 is a time chart of a case where a storage start time is a fuel injection time.

From the injection start time T1101 of the first injection pulse 1100 of one combustion cycle to the injection start time T1103 of the last injection pulse 1102 of the combustion cycle of FIG. 11, the number of injections and the division ratio which are used when calculating each injection amount of the multi-stage injection of the nth cylinder are stored as an latest calculation value 1102 at T1101.

Similarly, from the injection start time T1107 of the first injection pulse 1106 of the next combustion cycle to the injection start time T1109 of the last injection pulse 1108 of the combustion cycle, the number of injections and the division ratio which are used when calculating each injection amount of the multi-stage injection of the nth cylinder are stored as an latest calculation value 1110 at T1107.

In addition, in a case where the injection pulse width can be changed during the injection, from the injection start time T1101 of the first injection pulse 1100 to the injection end time T1104 of the last injection pulse 1102 of the combustion cycle, the number of injections and the division ratio may be stored.

Here, the ECU 9 functions as a second storage unit which ends the storage at the start time (T1103) or the end time (T1104) of the last fuel injection (1102) of one combustion cycle. Moreover, the end of the storage means that a value stored by a memory is released.

The ECU 9 may end the storage within an interval from the start time (T1103) or the end time (T1104) of the last fuel injection of one combustion cycle to the end time (T1107) of the second period (for example, an interval from T1101 to T1107).

Therefore, it is possible to obtain effects similar to those described in FIGS. 5 to 10.

Seventh Control Example

Next, a seventh control example of the fuel injection control will be described with reference to FIG. 12.
FIG. 12 is a time chart illustrating the seventh control example of the fuel injection control executed by the ECU according to an embodiment of the invention. In FIG. 12, the storage start time is the injection control reference position and the storage end time is the ignition time.

From the injection control reference position T1200 of one combustion cycle to the ignition time T1201 of the combustion cycle of FIG. 12, the number of injections and the division ratio which are used when calculating each injection amount of the multi-stage injection of the nth cylinder are stored as the latest calculation value 1202 at T1200.

Here, the ECU 9 functions as the second storage unit that ends the storage at the ignition time (for example, T1201) of one combustion cycle.

Similarly, from the injection control reference position T1203 of the next combustion cycle to the ignition time T1204 of the combustion cycle, the number of injections and the division ratio are stored as the latest calculation value 1205 at T1203.

Therefore, it is possible to obtain effects similar to those described in FIGS. 5 to 11.

Eighth Control Example

Next, an eighth control example of the fuel injection control will be described with reference to FIG. 13. FIG. 13 is a time chart illustrating the eighth control example of the fuel injection control executed by the ECU according to an embodiment of the invention. In FIG. 13, the storage end time is a time when a desired time Δt has elapsed from the storage state time.

From the injection start time T1301 of the first injection pulse 1300 to a time T1302 when a predetermined time Δt has elapsed from T1301 of one combustion cycle of FIG. 13, the number of injections and the division ratio are stored similar to the contents explained in FIGS. 11 and 12. The predetermined time Δt is a value which is estimated time from T1301 to the last injection of the combustion cycle based on the operation state, and may have a certain margin considering a change in the operation state. In addition, the predetermined time Δt may be set as a time corresponding to the crank angle.

Here, the ECU 9 functions as the second storage unit that ends to store at a time (for example, T1302) when the predetermined time Δt has elapsed from the start time (for example, T1301) or the end time of the first fuel injection of one combustion cycle based on the operation state of the internal combustion engine.

Therefore, it is possible to obtain effects similar to those described in FIGS. 5 to 12.

In FIGS. 5 to 13, although the time in which the division ratio and the number of fuel injections of the invention are updated or stored is described, even if an example of the storage start time and an example of the storage end time are exchanged, the same effects can be obtained if the time includes an interval from the first injection start to the last injection start of the combustion cycle.

Therefore, any combination of times in FIG. 5 to 13, or another time corresponding thereto may be used. In addition, in the control in which each injection amount calculation of the multi-stage injection is not based on the division ratio and the total injection amount is equally divided by the number of injections, the division ratio is not necessary to be stored. The same is true for the number of injections.
(Second Problem)

In the above, the improvement of the accuracy of the air/fuel ratio control with respect to the change in the number of demand injections and the division ratio according to the invention is described.

Hereinafter, a second problem of the multi-stage injection control will be described with reference to FIG. 14 when a fuel pressure of the internal combustion engine is changed. FIG. 14 is an example of a time chart illustrating an injection pulse width necessary for injecting desired fuel when the fuel pressure of the internal combustion engine is changed.

Reference numeral 1400 of FIG. 14 indicates the injection pulse width necessary for injecting desired fuel, 1401 indicates the fuel pressure, and if the fuel pressure 1401 is increased, the injection pulse width 1400 is decreased. As described above, as a feature of the injector 5, even in a case where the same amount of fuel is injected, a demand injection pulse width is necessary to correct by the fuel pressure supplied to the injector 5. Here, the necessity of correction of the fuel pressure is generally known and the description thereof will be omitted here.

At time T1402 of FIG. 14, in a case where the injection pulse width is set to a value of 1404 and the start time of the injection is set to time T1403, when the injection pulse width is output at time T1403, the injection pulse width is largely different from a value of the injection pulse width 1405 which is actually required and the demand air/fuel ratio cannot be satisfied. In order to accurately control each injection amount of the multi-stage injection, similarly, it is necessary to perform control in consideration of fluctuation of the fuel pressure.

(Calculation of Injection Pulse Width)

The calculation control of the number of injections and the division ratio, and a flow of the multi-stage injection control will be described. FIG. 15 is an example of a flowchart of the calculation control and a multi-stage injection control of the number of injections and the division ratio executed by the ECU according to an embodiment of the invention. However, for the sake of convenience of description, the multi-stage injection control of one cylinder among a plurality of cylinders of the internal combustion engine is illustrated as a representative.

A calculation process of FIG. 15 is repeatedly executed at a predetermined calculation period. That is, processes from step S1500 to step S1504 are repeatedly executed by the ECU 9 at a predetermined calculation period. The calculation period is a period based on at least one of time and the crank angle (for example, every 1 ms or every 10 deg). In addition, the calculation may be performed with an interruption process to the ECU 9 triggered by notifying the ECU 9 of the injection start time of the injector 5. In step S1500 of FIG. 15, a total injection pulse width TI_ALL for injecting the total fuel amount demanded in one combustion cycle is calculated. The total injection pulse width TI_ALL is a value calculated based on the intake air amount measured by the air flow sensor 20, the engine speed, the water temperature obtained from the water temperature sensor 8, the fuel pressure obtained from the fuel pressure sensor 26, or the like, and is preferably the calculation period capable of corresponding to fluctuation of the fuel pressure.

Here, the ECU 9 functions as a calculation unit that calculates the total fuel amount demanded in one combustion cycle based on the operation state and the fuel pressure of the internal combustion engine. In addition, the ECU 9 and a memory (not illustrated) cooperate to function as the first storage unit that stores the total fuel amount calculated by the calculation unit in the first period.

In step S1501 of FIG. 15, the number of injections N and a division ratio SPLIT_n (n is an integer equal to or less than N) are calculated.

In step S1502 of FIG. 15, it is determined whether or not the number of injections and the division ratio are updated, if the determination is true, the procedure proceeds to step S1503 and the number of injections N and the division ratio SPLIT_n which are used in each injection amount calculation of the multi-stage injection are updated to the values calculated in step S1501. When it is not update time, the procedure proceeds to the process of step S1504 of FIG. 15.

In the processes from step S1500 to step S1503 of FIG. 15, the number of injections and the division ratio can be constantly held during the injection interval by not updating the number of injections and the division ratio during the injection interval of the cylinder while reflecting the latest number of injections and the division ratio.

In step S1504 of FIG. 15, each injection pulse width TI_n (n is an integer equal to or less than N) is calculated by the following equation (1) using the number of injections N of the multi-stage and the division ratio SPLIT_n updated in step S1503, and the demand total injection pulse width TI_ALL calculated in step S1500.

$$TI\_n = TI\_ALL \times SPLIT\_n \quad (1)$$

Each injection pulse width TI_n calculated in step S1504 reflects the latest total injection pulse width TI_ALL while keeping the division ratio during one combustion cycle. Therefore, even if the fuel pressure change occurs when the multi-stage injection is executed, it is possible to perform the air/fuel ratio control with high accuracy.

Here, the ECU 9 functions as the control unit that controls the fuel injection valve so as to inject fuel according to the total fuel amount stored by the first storage unit.

In addition, in the control in which each injection amount calculation of the multi-stage injection is not based on the division ratio and the total injection amount is equally divided by the number of injections, calculation may be performed by the following equation (2).

$$TI\_n = TI\_ALL \times N \quad (2)$$

Moreover, in a case where the calculation interval from step S1500 to step S1504 is one combustion cycle, step S1502 of FIG. 15 may be omitted.

In addition, step S1502 and S1503 may be deleted from the flowchart illustrated in FIG. 15 and step S1503 may be executed with another trigger (crank angle, injector drive signal, and injection signal).

Although the embodiments of the invention are described above in detail, according to the embodiments, even when a change in the number of injections or the division ratio occurs, the multi-stage injection capable of controlling a desired air/fuel ratio with high accuracy can be performed.

The invention is not limited to the embodiments described above and various modifications are provided. The embodiments described above are explained to easily understand the invention and it is not necessarily limited to one having all the configurations described. Furthermore, it is possible to replace apart of the configurations of one embodiment with the configuration of another embodiment, and it is possible to add the configuration of another embodiment to the configuration of one embodiment. In addition, it is also possible to adjusted, delete, or replace other configurations with respect to a part of the configurations of each embodiment.

The start time (update time) of the second period is not limited to those illustrated in the embodiments described above. The start time of the second period may be a time within an interval from the start time of the last fuel injection in one combustion cycle before one combustion cycle to the start time of the first fuel injection in one combustion cycle.

REFERENCE SIGNS LIST

1 . . . engine
2 . . . piston
3 . . . intake valve
4 . . . exhaust valve
5 . . . injector
6 . . . ignition plug
7 . . . ignition coil
8 . . . water temperature sensor
9 . . . ECU
10 . . . intake pipe
11 . . . exhaust pipe
12 . . . three-way catalyst
13 . . . A/F sensor
15 . . . collector
16 . . . crank angle sensor
18 . . . electric control throttle
19 . . . throttle valve
20 . . . air flow sensor
21 . . . combustion chamber
22 . . . accelerator opening degree sensor
23 . . . fuel tank
26 . . . fuel pressure sensor

The invention claimed is:

1. A control device of an internal combustion engine, the device comprising:
a plurality of sensors that measure operating conditions of the internal combustion engine;
a plurality of fuel injectors that provide fuel to cylinders of the internal combustion engine; and
an electronic control unit (ECU) that is communicatively coupled to the plurality of sensors and the plurality of fuel injectors,
wherein the ECU is configured to:
calculate a total fuel injection rate that indicates a rate of a total number of fuel injections that are performed during a complete combustion cycle
calculate a first fuel injection rate for a first period within the complete combustion cycle based on the total fuel injection rate,
control the plurality of fuel injectors to provide fuel in the first period of the complete combustion cycle based on the first fuel injection rate calculated,
receive first measurements from the plurality of sensors during the first period, wherein the first measurements are obtained subsequent to the plurality of fuel injectors providing fuel in the first period,
calculate a second fuel injection rate for a second period within the complete combustion cycle based on the total fuel injection rate, the first measurements, and the first fuel injection rate, and
control the plurality of fuel injectors to provide fuel in the second period of the complete combustion cycle based on the second fuel injection rate calculated.

2. The control device according to claim 1, wherein the second period is a period in synchronization with a rotation of the internal combustion engine.

3. The control device according to claim 1, wherein a start time of the second period is a time within an interval from the start time of a last fuel injection in one combustion cycle before the one combustion cycle until the start time of the first fuel injection in the one combustion cycle.

4. The control device according to claim 3, wherein the start time of the second period is the start time of the first fuel injection in the one combustion cycle.

5. The control device according to claim 3, wherein the start time of the second period is the start time or an end time of the last fuel injection in one combustion cycle before the one combustion cycle.

6. The control device according to claim 3, wherein the start time of the second period is an ignition time in one combustion cycle before the one combustion cycle.

7. The control device according to claim 3, wherein the start time of the second period is a predetermined time of an intake stroke of the one combustion cycle.

8. The control device according to claim 7, wherein the predetermined time is a time in accordance with a predetermined crank angle.

9. The control device according to claim 1, wherein the ECU further comprises a memory;
wherein the ECU is further configured to store the first fuel injection rate in the memory in synchronization with a reference reference unit.

10. The control device according to claim 1, wherein the ECU further comprises a memory;
wherein the ECU is further configured to store in the memory the second fuel injection rate at a start time or an end time of a last fuel injection of the complete combustion cycle.

11. The control device according to claim 10, wherein the ECU is further configured to store the second fuel injection rate at an ignition time of a subsequent combustion cycle.

12. The control device according to claim 1, wherein the plurality of sensors measure an operation state and a fuel pressure of the internal combustion engine,
wherein the ECU is further configured to store a total fuel amount measured by the plurality of sensors calculated in the first period.

13. The control device according to claim 1, wherein the first period is shorter than the second period.

14. The control device according to claim 1, wherein the second period is a period in synchronization with rotation of the internal combustion engine.

15. The control device according to claim 1, wherein the total fuel injection rate is calculated based on at least an operation state of the internal combustion engine.

* * * * *